United States Patent
Nagase et al.

(10) Patent No.: US 9,499,171 B2
(45) Date of Patent: Nov. 22, 2016

(54) DRIVING SUPPORT APPARATUS FOR VEHICLE

(71) Applicant: Fuji Jukogyo Kabushiki Kaisha, Tokyo (JP)

(72) Inventors: Takayuki Nagase, Tokyo (JP); Koji Matsuno, Tokyo (JP); Shiro Ezoe, Tokyo (JP); Harunobu Horiguchi, Tokyo (JP); Hajime Oyama, Tokyo (JP); Yasushi Takaso, Tokyo (JP); Masato Mizoguchi, Tokyo (JP); Osamu Takahashi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/738,854

(22) Filed: Jun. 13, 2015

(65) Prior Publication Data

US 2015/0375748 A1 Dec. 31, 2015

(30) Foreign Application Priority Data

Jun. 27, 2014 (JP) .................................. 2014-133147

(51) Int. Cl.
*B60W 30/18* (2012.01)
*B60W 30/09* (2012.01)
(Continued)

(52) U.S. Cl.
CPC ........ *B60W 30/18163* (2013.01); *B60W 10/04* (2013.01); *B60W 10/20* (2013.01);
(Continued)

(58) Field of Classification Search
CPC ......... B60W 30/18163; B60W 30/09; B60W 10/04; B60W 10/20; B60W 2550/20; B60W 2550/00; B60W 2720/24; B60W 2720/106; B60W 2600/00; B60W 30/0956; B60W 30/12; B60W 30/0953; B60W 30/162; B60W 2550/306; B60W 2750/306; B60W 50/0097; B62D 15/0255; G06K 9/00798; G06K 9/00825
See application file for complete search history.

(56) References Cited

U.S. PATENT DOCUMENTS 6,269,308 B1 * 7/2001 Kodaka .............. B62D 15/0265
340/435
8,155,856 B2 * 4/2012 Sekiguchi ............. B60W 30/16
340/435
(Continued)

FOREIGN PATENT DOCUMENTS

JP H 01-298500 A 12/1989
JP 2005-149402 A 6/2005
(Continued)

OTHER PUBLICATIONS

JPO Decision to Grant a Patent dated May 17, 2016 with an English translation thereof.
(Continued)

*Primary Examiner* — Russell Frejd
(74) *Attorney, Agent, or Firm* — McGinn IP Law Group, PLLC

(57) ABSTRACT

When a vehicle equipped with a driving support apparatus moves from an original traveling lane into a lane for passing in order to pass a preceding vehicle and an oncoming vehicle appears in the lane for passing, the safe passing of the preceding vehicle is determined to be impossible and the passing is interrupted even when the oncoming vehicle decelerates, in the case where a deceleration change amount of the oncoming vehicle is smaller than a threshold. On the other hand, when the deceleration change amount of the oncoming vehicle is equal to or greater than the threshold, whereby safety with respect to surrounding vehicles can be confirmed, and it is determined the vehicle can be safely returned in front of the preceding vehicle, the passing of the preceding vehicle is performed.

13 Claims, 3 Drawing Sheets

(51) Int. Cl.
*B60W 10/04* (2006.01)
*B60W 10/20* (2006.01)
*B60W 30/12* (2006.01)
*B60W 30/095* (2012.01)
*B60W 30/16* (2012.01)
*B60W 50/00* (2006.01)
*B62D 15/02* (2006.01)
*G06K 9/00* (2006.01)

(52) U.S. Cl.
CPC ........ *B60W 30/09* (2013.01); *B60W 30/0953* (2013.01); *B60W 30/0956* (2013.01); *B60W 30/12* (2013.01); *B60W 30/162* (2013.01); *B60W 50/0097* (2013.01); *B62D 15/0255* (2013.01); *G06K 9/00798* (2013.01); *G06K 9/00825* (2013.01); *B60W 2550/00* (2013.01); *B60W 2550/20* (2013.01); *B60W 2550/306* (2013.01); *B60W 2600/00* (2013.01); *B60W 2720/106* (2013.01); *B60W 2720/24* (2013.01); *B60W 2750/306* (2013.01)

(56) References Cited

U.S. PATENT DOCUMENTS

| | | |
|---|---|---|
| 2011/0313665 A1 | 12/2011 | Lueke et al. |
| 2015/0039156 A1* | 2/2015 | Shibata ............ B60T 7/22 701/1 |
| 2015/0360721 A1* | 12/2015 | Matsuno ......... B62D 15/0255 701/41 |

FOREIGN PATENT DOCUMENTS

| | | |
|---|---|---|
| JP | 2009-248892 A | 10/2009 |
| JP | 2012-519346 A | 8/2012 |
| WO | WO 2010/099789 A1 | 9/2010 |

OTHER PUBLICATIONS

JPO Notification of Reason for Refusal dated Feb. 17, 2016 with an English translation thereof.

* cited by examiner

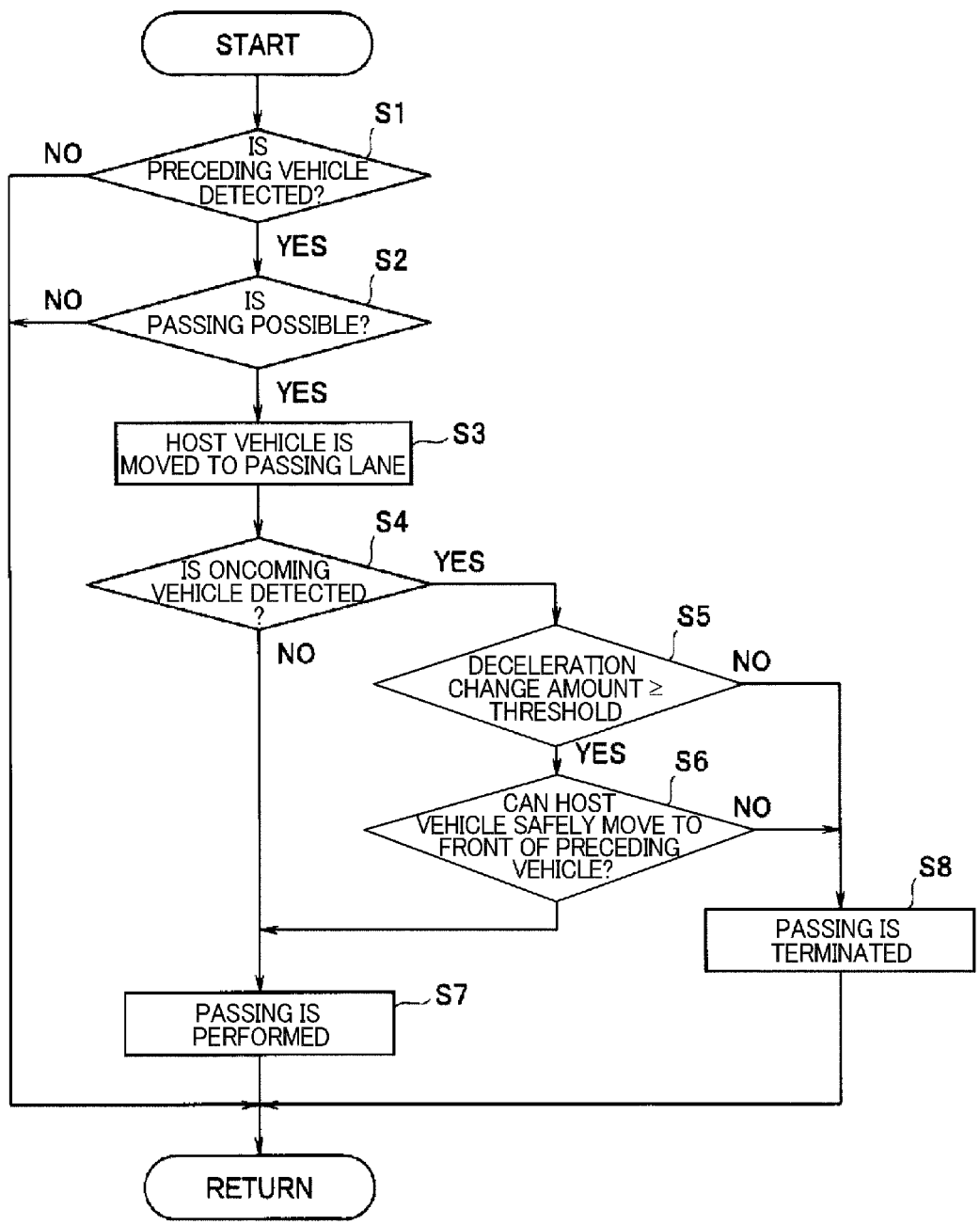

DRIVING SUPPORT APPARATUS FOR VEHICLE

CROSS-REFERENCE TO RELATED APPLICATIONS

The present application claims priority from Japanese Patent Application No. 2014-133147 filed on Jun. 27, 2014, the entire contents of which are hereby incorporated by reference.

BACKGROUND

1. Technical Field

The present invention relates to a driving support apparatus for a vehicle that enables passing control relating to a preceding vehicle that travels in front of a host vehicle.

2. Related Art

In recent years, a variety of support apparatuses for vehicles such as automobiles have been developed and put to practical use, those apparatuses using a camera or a radar device installed on the vehicle to recognize the traveling environment around the vehicle and reduce operational load on the driver. A system disclosed in Japanese Unexamined Patent Application Publication (JP-A) No. 2009-248892 is an example of such a driving support apparatus. In the system, when the speed of the preceding vehicle is lower than the set speed of the vehicle equipped with the driving support apparatus, it is determined whether or not the vehicle can pass the preceding vehicle on the basis of the traveling position of the vehicle and traffic information, and, when it is determined that the passing is possible, the vehicle is caused to pass the preceding vehicle by automatic driving.

In JP-A No. 2009-248892, whether or not the preceding vehicle can be passed is determined in advance, and a passing preparation operation is performed when it is determined that passing is possible, thereby enabling automatic passing without frightening or giving discomfort to the driver of the vehicle or drivers of the surrounding vehicles, but no particular attention is paid to changes in the surrounding conditions after the passing has been started.

Thus, depending on the change in conditions after the passing of the preceding vehicle has been started, it may be necessary to terminate the passing or the passing can be safely completed. In either case, driving support is needed that gives no anxiety to the drivers.

SUMMARY OF THE INVENTION

The present invention has been designed in consideration of the circumstances described above, and an object thereof is to provide a driving support apparatus for a vehicle that adequately determines, according to the change in conditions after the passing of the preceding vehicle has been started, whether to interrupt or execute the passing and causes no anxiety to the drivers.

An aspect of the present invention provides a driving support apparatus for a vehicle that determines whether or not the vehicle can pass a preceding vehicle traveling in front of the vehicle and executes passing control relating to the preceding vehicle when the passing is possible, the driving support apparatus including: a passing environment monitoring module that monitors changes in travel environment of mainly a lane for passing to which the vehicle moves to pass the preceding vehicle, when the passing of the preceding vehicle is determined to be possible and the vehicle is moved to the lane for passing; and a passing execution/interruption determination module that, when an oncoming vehicle has been detected in the lane for passing by the passing environment monitoring module, determines whether to execute or interrupt the passing of the preceding vehicle on the basis of a deceleration change amount of the oncoming vehicle and a relationship between the vehicle with at least one surrounding vehicle in terms of position and relative speed.

BRIEF DESCRIPTION OF THE DRAWINGS

FIG. 3 is a flowchart of a passing control process.

DETAILED DESCRIPTION

An example of the present invention will be described hereinbelow with reference to the drawings.

Figure 1:
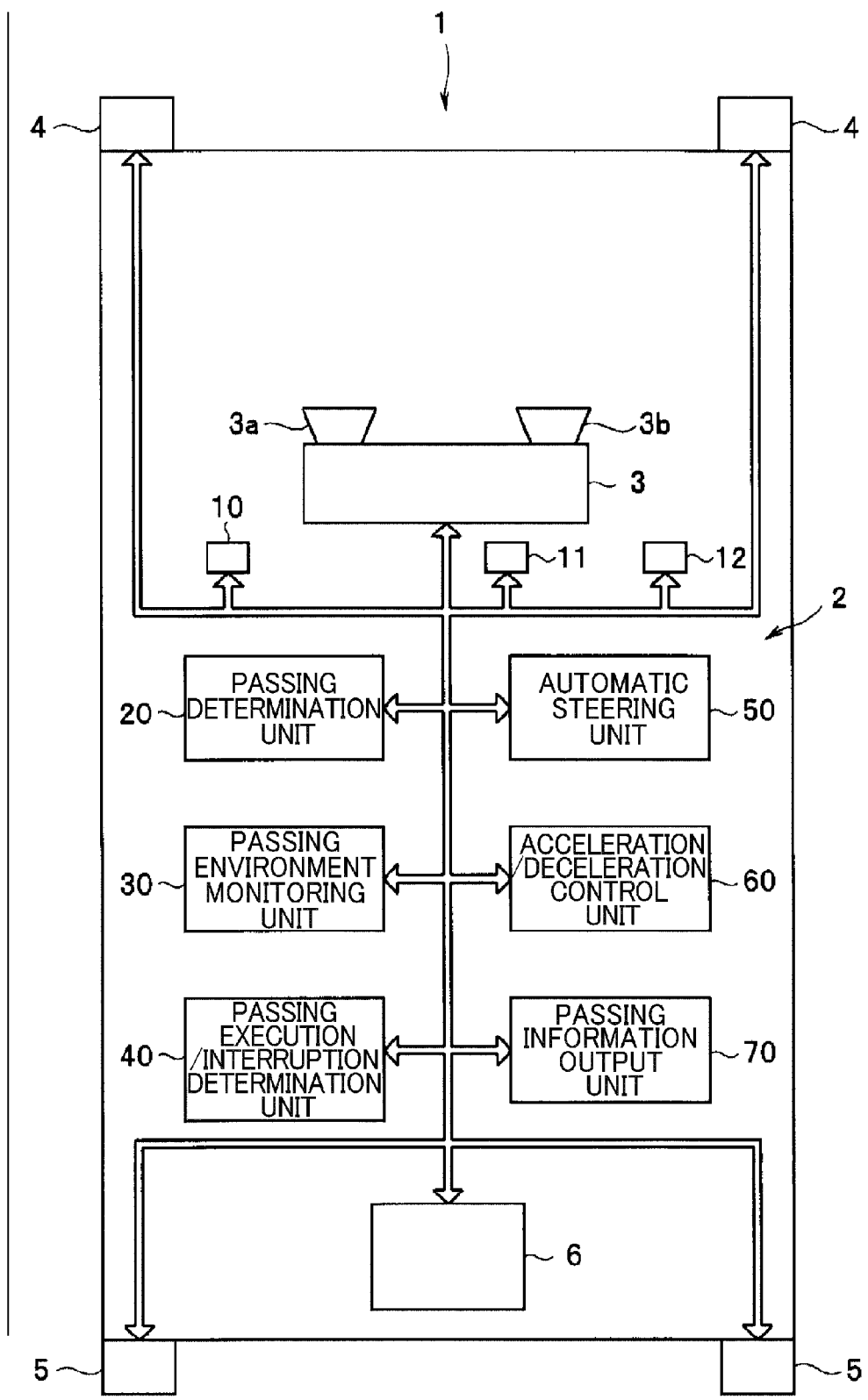
FIG. 1 is a schematic diagram of a driving support apparatus for a vehicle according to an example of the present invention.

In FIG. 1, the reference numeral 1 denotes a vehicle such as an automobile (hereinafter also referred to as "subject vehicle"). The subject vehicle 1 includes a driving support apparatus 2 that performs driving support control including automatic driving that is independent of the driving operation performed by the driver. The driving support apparatus 2 is provided with an external environment recognition unit constituted by various devices recognizing the surrounding external environment around the subject vehicle 1, and receives signals from a variety of sensors detecting the driving state of the subject vehicle 1.

In the example, the driving support apparatus 2 is equipped with a stereo camera unit 3 that detects three-dimensional positions of objects in front of the vehicle 1, side radar units 4 that detect objects in front and on the sides of the vehicle 1, and rearward radar units 5 that detect objects behind the vehicle with microwaves or the like, as the devices for sensing the external environment. In addition, the driving support apparatus is equipped with a traffic information communication unit 6 that acquires traffic information by infra communication such as road-vehicle communication and vehicle-vehicle communication. The units 4 to 6 constitute the external environment recognition unit that recognizes the external environment of the vehicle 1.

The stereo camera unit 3 mainly includes two, left and right, cameras 3a and 3b disposed close to a room mirror on the inner side of a front window in the upper portion of a vehicle cabin. The left and right cameras 3a and 3b are shutter-synchronized cameras having imaging elements such as CCD or CMOS and are secured at a predetermined base length. An image processing unit that performs stereo image processing of a pair of images captured by the left and right cameras 3a and 3b and acquires three-dimensional position information in the actual space of an object in front, such as a preceding vehicle, is provided integrally with the stereo camera unit 3. The three-dimensional position of the object is obtained by converting image coordinate values and parallax data on the object obtained by the stereo image processing into coordinate values in a three-dimensional space that takes, for example, the road surface directly below the center of the stereo camera as an origin point, a lateral direction of the vehicle as an X axis, a height direction of the vehicle as an Y axis, and a longitudinal direction of the vehicle (distance direction) as a Z axis.

The side radar units 4 are short-range radars detecting objects that are present around the subject vehicle at a comparatively short distance therefrom. For example, the side radar units flare disposed in the left and right corner of a front bumper, transmit radar waves such as microwaves and high-band milliwaves to the outside, receive waves reflected from the objects, and measure the distance to or azimuth of the objects that are positioned in front and on the front sides of the subject vehicle and outside of the field of view of the stereo camera unit 3. Further, the rearward radar units 5 are disposed, for example, at the left and right corner portions of a rear bumper, likewise transmit radar waves to the outside, receive waves reflected from the objects, and measure the distance to or azimuth of the objects positioned behind and on the rear sides of the subject vehicle.

The objects located behind the subject vehicle may be detected by image recognition using a rearview camera, or by sensor fusion of image recognition with another sensing device.

The traffic information communication unit 6 acquires traffic information such as intersections or areas that cannot be seen (cannot be sensed) by the stereo camera unit 3, the side radar units 4, and the rearward radar units 5 through road-vehicle communication using equipment installed on the road or vehicle-vehicle communication with other vehicles. The traffic information communication unit 6 may be a dedicated device, and also may use a communication device provided at a positioning device, such as a navigation device, that holds map information on the traveling environment such as positions of intersections and traffic lights, the number of lanes on the road, the curvature radius of the road, the speed limit, and passing prohibition intervals.

Meanwhile, the sensors which detect the driving state of the subject vehicle 1 include a vehicle speed sensor 10 that detects the vehicle speed, a steering angle sensor 11 that detects a steering angle, and a G sensor 12 that detects an acceleration. The driving support apparatus 2 performs driving support control of the vehicle 1 on the basis of information on the traffic environment around the subject vehicle 1 which is acquired by the units 4 to 6, and the driving state information on the subject vehicle 1 which is detected by various sensors such as the vehicle speed sensor 10, the steering angle sensor 11, and the G sensor 12.

The driving support control performed by the driving support apparatus 2 includes adaptive cruise control (ACC) relating to the preceding vehicle as one of the main functions, and passing control relating to the preceding vehicle that is a function associated with the ACC control. In the passing control performed by the driving support apparatus 2, in the case where a preceding vehicle is recognized in front of the subject vehicle and the speed of the preceding vehicle is lower than the set speed of the subject vehicle, it is determined whether or not the subject vehicle can pass the preceding vehicle, on the basis of the traveling position of the subject vehicle, the speed of the subject vehicle relative to the preceding vehicle, and traffic information on the surroundings of the subject vehicle. When it is determined that the passing is possible, the passing of the preceding vehicle is executed with automatic steering.

The passing control performed by the driving support apparatus 2 is described hereinbelow. The passing control, as referred to herein, is performed to move the subject vehicle from the original traveling lane into an adjacent lane (passing lane) in order to pass the preceding vehicle and then return the subject vehicle to the original traveling lane (move the subject vehicle in front of the preceding vehicle) after passing the preceding vehicle. Considered herein as the passing lane are both the lane adjacent to the original traveling lane, from among a plurality of lanes on one side of a center line, and an oncoming lane on the opposite after the center line has been crossed. The driving support apparatus 2 is provided with a passing determination module 20, a passing environment monitoring module 30, a passing execution/interruption determination module 40, an automatic steering module 50, an acceleration/deceleration control module 60, and a passing information output module 70 as functional modules relating to such passing control.

The passing determination module 20 uses the status of the white line (lane line) on the road that is recognized by the stereo camera unit 3 and the traffic information acquired through the traffic information communication unit 6 to determine whether or not to pass the preceding vehicle when the subject vehicle is to reach the preceding vehicle that travels at a speed lower than that of the subject vehicle or when the preceding vehicle decelerates. The determination is made based on the assumption that the present traveling interval is not a passing prohibited interval and that there are no obstacles for passing, such as construction, accidents, toll booths, traffic lights, and intersections.

The detection of the white lane can be performed by estimating changes in brightness in the lateral direction of the road in the image plane of the image captured by the stereo camera unit 3, extracting a group of points serving as candidates for the white line, processing the time-series data on the spatial coordinate positions of the white line candidate points, and using a model approximating a white line shape in an XYZ coordinate space having the subject vehicle (stereo camera unit 3) as a point of origin. An approximation model in which linear components obtained by Hough transform are linked, or a model with approximation by a curve, such as a second order curve, can be used as the white line approximation model.

Whether to perform the passing is determined on the basis of the travel speed of the subject vehicle, the relative speed of the subject vehicle and the preceding vehicle, and the distance between the subject vehicle and the preceding vehicle and other information that are acquired from the outputs of the stereo camera unit 3 and the vehicle speed sensor 10, and the presence/absence of a following vehicle in the oncoming lane behind the subject vehicle that is acquired from the output of the rearward radar units 5. For example, when no following vehicle is approaching the subject vehicle in the passing lane behind the subject vehicle and also the difference between the set speed and actual traveling speed of the subject vehicle is equal to or greater than a predetermined value and the distance between the vehicles is less than a predetermined distance, it is determined that appropriate passing of the preceding vehicle is possible and an instruction to start the passing control is issued to the automatic steering module 50 and the acceleration/deceleration control module 60.

When the difference in traveling speed between the subject vehicle and the preceding vehicle has become extremely large (for example, when emergency braking has been performed in the preceding vehicle), the collision preventing control is preferentially performed without the passing determination to avoid the collision between the subject vehicle and the preceding vehicle.

In response to the passing determination made by the passing determination module 20, the passing environment monitoring module 30 starts the passing control, and monitors changes in the travel environment of mainly the passing lane when the subject vehicle has moved to the passing lane. More specifically, when the subject vehicle has moved to the passing lane in order to pass the preceding vehicle, the passing environment monitoring module 30 monitors the presence/absence of a suddenly appearing oncoming vehicle, the distance between the subject vehicle and the oncoming vehicle, and the change in the speed of the oncoming vehicle. Further, the passing environment monitoring module 30 monitors the position and speed (relative speed) of surrounding vehicles (such as a preceding vehicle that is the target of passing in the original traveling lane, a pre-preceding vehicle in front of the preceding vehicle) located around the subject vehicle, and travel environment such as the conditions of the road surface of the passing lane. The conditions of the road surface of the passing lane includes a low-μ road on which the friction coefficient μ of the road surface is lower than that of a dry road due to weather conditions such as rain or snow, and the gradient of the road in the travel direction. Such conditions are recognized by image recognition performed through the stereo camera unit 3 or traffic and meteorological information acquired through the traffic information communication unit 6.

The low-μ road may be determined with not only with the meteorological conditions, but also with a road friction coefficient μ estimated from travel control parameters of the vehicle.

The passing execution/interruption determination module 40 examines whether or not an oncoming vehicle has been detected by the passing environment monitoring module 30 when the subject vehicle has moved to the passing lane, to determine whether or not to interrupt the passing or continue the passing. When no oncoming vehicle is detected in the passing lane, the passing is continued, and the subject vehicle is returned to the original traveling lane in front of the preceding vehicle, whereby the passing is completed. Meanwhile, when an oncoming vehicle suddenly appears in the passing lane and the oncoming vehicle is detected, it is determined whether to continue the passing and return to the original traveling lane in front of the preceding vehicle or to interrupt the passing and return to the original traveling lane behind the preceding vehicle, based on the positional relationship among the subject vehicle, the oncoming vehicle and the surrounding vehicles, and their relative speeds.

More specifically, referring to FIG. 2, in the case an oncoming vehicle C1 traveling toward the subject vehicle appears in a passing lane P2 when the subject vehicle changes lanes from an original traveling lane P1 to the passing lane P2 and moves to a position A1, it is determined, according to the conditions (1) to (3) described hereinbelow, whether to interrupt the passing and return to a position A2 behind a preceding vehicle B1 in the original traveling lane, or to pass safely the preceding vehicle B1 and then return to a position A3 in front of the preceding vehicle B1 in the original traveling lane, and the determination result is output to the automatic steering module 50 and the acceleration/deceleration control module 60.

(1) The Deceleration Change Amount of the Oncoming Vehicle is Less than the Threshold If the oncoming vehicle decelerates, but a deceleration change amount thereof is less than a threshold, it is determined that safe passing of the preceding vehicle is impossible, and thus the passing is interrupted. The deceleration change amount is a change amount of the speed or acceleration of the oncoming vehicle with respect to the subject vehicle. If the deceleration change amount is smaller than the threshold, that is, if the oncoming vehicle does not decelerate or decelerates only to a small degree, the passing is interrupted, and the automatic steering module 50 and the acceleration/deceleration control module 60 are instructed to return the subject vehicle to the original traveling lane. Referring to FIG. 2, if the deceleration change amount of the oncoming vehicle C1 is smaller than the threshold when the subject vehicle is at the position A1, the passing of the preceding vehicle B1 is interrupted, and the subject vehicle returns from the passing lane P2 to the original traveling lane P1 and moves to the position A2 behind the preceding vehicle B1.

The threshold is set as a deceleration change amount at which the distance between the subject vehicle and the oncoming vehicle after a predetermined time (after t sec) becomes a safety limit distance. The safety limit distance is a distance that ensures a safe distance to the oncoming vehicle after the preceding vehicle has been passed and enables a safe return of the subject vehicle in front of the preceding vehicle in the original traveling lane. If an estimated inter-vehicle distance after t sec that is obtained by subtracting the distance change amount after t sec which is based on the deceleration change amount from the present inter-vehicle distance is smaller than the limit distance, it is determined that the subject vehicle cannot pass the preceding vehicle to return to the original lane.

The threshold is variably changed according to the degree of change in the vehicle speed, the relationship between the speed of the subject vehicle and the speed limit, and the distance between the subject vehicle and the oncoming vehicle. The threshold is set such that a safer determination is made, for example, by increasing the threshold when the change in speed of the oncoming vehicle is large, increasing the threshold as the speed of the subject vehicle approaches the speed limit, and increasing the threshold as the distance between the subject vehicle and the oncoming vehicle decreases. The threshold is also increased such that a safer determination is made when the road friction coefficient μ in the passing lane decreases due to meteorological conditions such as rain and snow, or when the passing lane is the oncoming lane.

As for the vehicle speed that is used for determining whether or not the passing is safe, the margin time that ensures safety is calculated under a condition that the acceleration can be performed only up to a speed limit, and the determination may be made based thereon.

(2) The Deceleration Change Amount of Oncoming Vehicle is Equal to or Higher than the Threshold, and Safety with Respect to the Surrounding Vehicles is Confirmed If the deceleration change amount of the oncoming vehicle is equal to or higher than the threshold and it has been confirmed that the subject vehicle can be safely returned in front of the preceding vehicle in the original traveling lane, the passing control performed by the automatic steering module 50 and the acceleration/deceleration control module 60 is continued. In this case, referring to FIG. 2, the subject vehicle is accelerated to pass the preceding vehicle B1 from the position A1, and then the subject vehicle moves to the position A3 in front of the preceding vehicle B1 in the original traveling lane P1, thereby completing the passing.

Whether or not the subject vehicle can be safely returned in front of the preceding vehicle is determined based on the relative speed and positional relationship of the subject vehicle and the surrounding vehicles such as the preceding vehicle and a pre-preceding vehicle located in front of the preceding vehicle. For example, in the case where the relative speed of the preceding vehicle and the subject vehicle is equal to or higher than a set speed and there is no pre-preceding vehicle, or the distance between the preceding vehicle and the pre-preceding vehicle is equal to or greater than a set distance that allows the subject vehicle safely to cut in therebetween, it is determined that the subject vehicle can be safely returned in front of the preceding vehicle.

(3) The Deceleration Change Amount of the Oncoming Vehicle is Equal to or Higher than the Threshold, but Safety with Respect to Surrounding Vehicles Cannot be Ensured If the deceleration change amount of the oncoming vehicle is equal to or higher than the threshold, but it is determined, from the relationship between the subject vehicle and the surrounding vehicles, such as the relative positions and speeds thereof, that the subject vehicle cannot be safely returned in front of the preceding vehicle in the original traveling lane, the passing is interrupted and the automatic steering module 50 and the acceleration/deceleration control module 60 are instructed to return the subject vehicle into the original traveling lane. In this case, referring to FIG. 2, the passing of the preceding vehicle B1 is interrupted at the position A1 in the passing lane P2, and the subject vehicle returns to the original traveling lane P1 and moves to the position A2 behind the preceding vehicle B1.

In response to an instruction to start the passing control from the passing determination module 20, the passing control performed by the automatic steering module 50 and the acceleration/deceleration control module 60 blink a turn light lamp with the automatic steering module 50, and control a power steering device (not illustrated in the figure) to move the subject vehicle from the traveling lane into the oncoming lane. Further, the acceleration/deceleration control module 60 controls an electronic throttle device (not illustrated in the figure) and moves the subject vehicle into the passing lane while accelerating the subject vehicle.

In this case, if an oncoming vehicle is not detected in the passing lane and an instruction to interrupt the passing control is not output from the passing execution/interruption determination module 40, the acceleration of the subject vehicle is increased to pass the preceding vehicle. When the distance to the preceding vehicle becomes adequate, the subject vehicle is returned to the original traveling lane and positioned in front of the preceding vehicle, thereby completing the passing control.

On the other hand, in the case where an oncoming vehicle is detected in the passing lane and the passing execution/interruption determination module 40 instructs to interrupt the passing, the steering and acceleration/deceleration control is performed such as to decelerate the subject vehicle and return the subject vehicle behind the preceding vehicle in the original traveling lane. Further, when the oncoming vehicle is detected but the safe passing of the preceding vehicle is determined to be possible on the basis of the deceleration change amount of the oncoming vehicle and the relationship with surrounding vehicles, the acceleration of the subject vehicle is increased to pass the preceding vehicle, and once the distance to the preceding vehicle becomes adequate, the subject vehicle is returned to the original traveling lane and positioned in front of the preceding vehicle, whereby the passing control is completed.

The passing information output module 70 performs voice output or image output in order to present various types of information in the passing control to the driver. For example, voice guidance relating to the start of the passing operation, the presence of the following vehicle, or the start of passing is output to the driver, and the driver is notified of the control contents corresponding to changes in conditions such as the interruption of passing due to the appearance of the oncoming vehicle and the execution of passing when the possibility of safe passing has been confirmed despite the appearance of the oncoming vehicle.

The process in the driving support apparatus 2 that realizes the above-described passing control is described hereinbelow with reference to the flowchart depicted in FIG. 3.

In the passing control, firstly, in step S1, it is examined whether or not the preceding vehicle has been detected by the stereo camera unit 3. If a preceding vehicle has not been detected, the process exits the flow, and if a preceding vehicle has been detected, the process advances to step S2 to determine whether or not it is possible to pass the preceding vehicle on the basis of the travel environment recognized from the outputs of, for example, the stereo camera unit 3, the side radar units 4, the rearward radar units 5, and the vehicle speed sensor 10.

Figure 2:
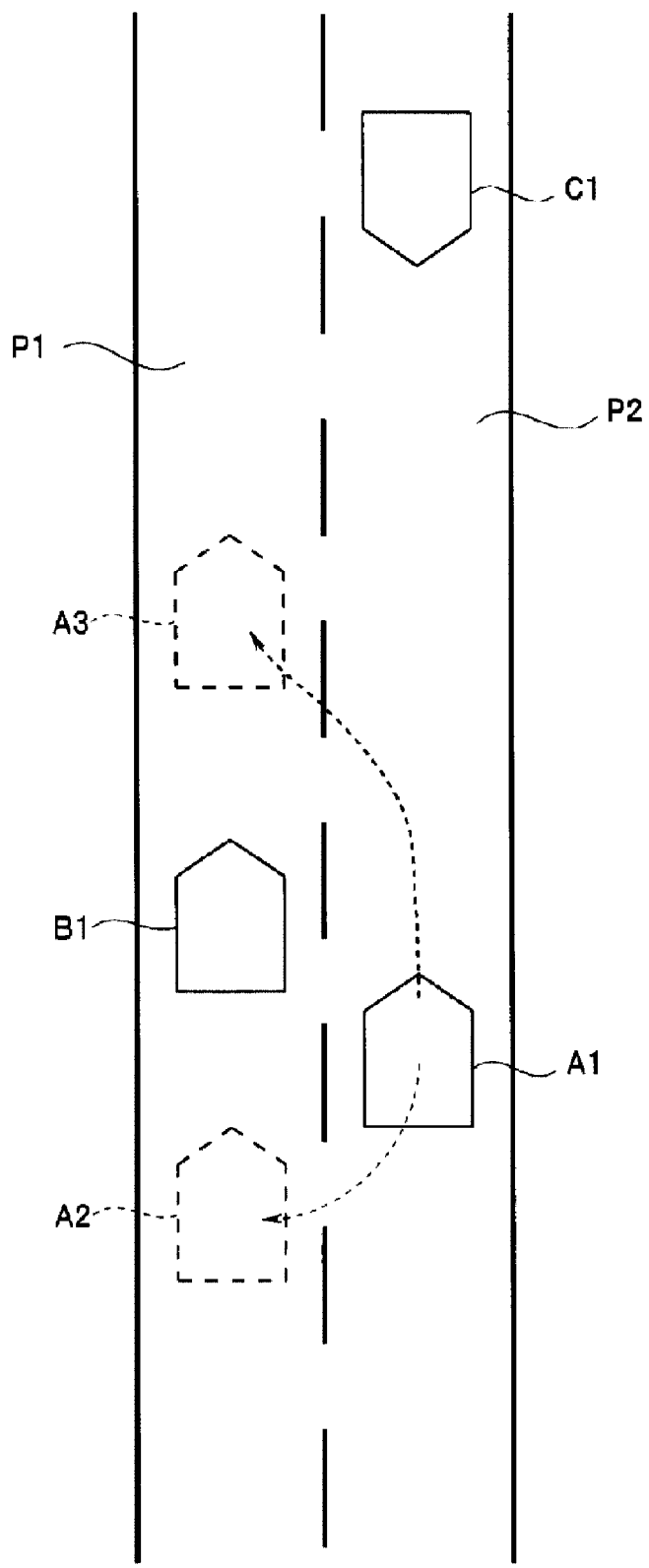
FIG. 2 illustrates the positions of vehicles during passing.

If it is determined that the passing is possible, the process advances from step S2 to step S3 to instruct the automatic steering module 50 and the acceleration/deceleration control module 60 to start the passing control, and the subject vehicle is accelerated and moved into the oncoming lane through the power steering control performed by the automatic steering module 50 and the electronic throttle control performed by the acceleration/deceleration control module 60 (position A1 in FIG. 2). In this case, the driver of the subject vehicle is notified, for example, with a voice output, of the start of the passing by the passing information output module 70, the turn light lamps are caused to blink with the automatic steering module 50, and the drivers of the vehicles around the subject vehicle are notified that the subject vehicle has started the passing.

The process then advances to step S4 to examine, on the basis of information from the passing environment monitoring module 30, whether or not an oncoming vehicle has been detected. If no oncoming vehicle has been detected, the process advances from step S4 to step S7 to accelerate the subject vehicle through the electronic throttle control to pass the preceding vehicle. Once the subject vehicle passes the preceding vehicle and becomes at an adequate distance therefrom, the subject vehicle returns to the original traveling lane and moves in front of the preceding vehicle (position A3 in FIG. 2), whereby the passing control is completed.

Meanwhile, if an oncoming vehicle has been detected in step S4, the process advances from step S4 to step S5 to examine whether or not the oncoming vehicle has decelerated and whether or not the deceleration change amount is equal to or greater than the threshold. If the deceleration change amount is found in step S5 to be equal to or greater than the threshold, it is then examine in step S6 whether the subject vehicle can safely move to the front of the preceding vehicle.

If the deceleration change amount is equal to or greater than the threshold and the subject vehicle can safely move in front of the preceding vehicle, the process advances to the aforementioned step S7 to pass the preceding vehicle. If, on the other hand, the deceleration change amount is smaller than the threshold and it is not confirmed that the subject vehicle can safely move in front of the preceding vehicle, the process advances to step S8 to interrupt the passing and decelerate the subject vehicle is and return the subject vehicle behind the preceding vehicle in the original traveling lane.

As described, in the example, when the subject vehicle is moved to the passing lane to pass the preceding vehicle, even when the oncoming vehicle abruptly appears therein, whether to interrupt or perform the passing is determined by appropriately verifying the deceleration state of the oncoming vehicle or the relationship with the surrounding vehicles. As a result, the passing can be appropriately interrupted or completed according to the change in conditions after the passing has been started, and no anxiety is given to the driver.

The invention claimed is:

1. A driving support apparatus for a vehicle that determines whether or not the vehicle can pass a preceding vehicle traveling in front of the vehicle and executes passing control relating to the preceding vehicle when the passing is possible, the driving support apparatus comprising:
a passing environment monitoring module that monitors changes in a travel environment of mainly a lane for passing to which the vehicle moves to pass the preceding vehicle, when the passing of the preceding vehicle is determined to be possible and the subject vehicle is moved to the lane for passing; and
a passing execution/interruption determination module that, when an oncoming vehicle has been detected in the lane for passing by the passing environment monitoring module, determines whether to execute or interrupt the passing of the preceding vehicle on the basis of a deceleration change amount of the oncoming vehicle and a relationship between the vehicle and at least one surrounding vehicle in position and relative speed, wherein
the passing environment monitoring module monitors at least the presence/absence of the oncoming vehicle, position and relative speed of the at least one surrounding vehicle located around the subject vehicle, and road state in the lane for passing; and
the passing execution/interruption determination module determines to interrupt the passing of the preceding vehicle when the deceleration change amount of the oncoming vehicle is less than a threshold and determines to execute the passing of the preceding vehicle when the deceleration change amount of the oncoming vehicle is equal to or greater than the threshold and the vehicle can safely return to an original traveling lane on the basis of the relationship between the vehicle and the at least one surrounding vehicle in term of position and relative speed.

2. The driving support apparatus for a vehicle according to claim 1, wherein the deceleration change amount is a change amount of acceleration.

3. The driving support apparatus for a vehicle according to claim 2, wherein the threshold is a deceleration change amount that ensures a safety limit distance between the vehicle and the oncoming vehicle after a predetermined time.

4. The driving support apparatus for a vehicle according to claim 2, wherein
the threshold is variably changed according to a degree of change of the vehicle speed or a relationship between the speed of the vehicle and a speed limit.

5. The driving support apparatus for a vehicle according to claim 2, wherein the threshold is variably changed according to a relationship between the vehicle and the oncoming vehicle in terms of distance.

6. The driving support apparatus for a vehicle according to claim 2, wherein the threshold is set to be small when a road friction coefficient in the lane for passing is low.

7. The driving support apparatus for a vehicle according to claim 2, wherein the threshold is set to be small when the lane for passing is a traveling lane of the oncoming vehicle.

8. The driving support apparatus for a vehicle according to claim 1, wherein the deceleration change amount is a change amount of vehicle speed.

9. The driving support apparatus for a vehicle according to claim 1, wherein the threshold is a deceleration change amount that ensures a safety limit distance between the vehicle and the oncoming vehicle after a predetermined time.

10. The driving support apparatus for a vehicle according to claim 1, wherein
the threshold is variably changed according to a degree of change of the vehicle speed or a relationship between the speed of the vehicle and a speed limit.

11. The driving support apparatus for a vehicle according to claim 1, wherein the threshold is variably changed according to a relationship between the vehicle and the oncoming vehicle in terms of distance.

12. The driving support apparatus for a vehicle according to claim 1, wherein the threshold is set to be small when a road friction coefficient in the lane for passing is low.

13. The driving support apparatus for a vehicle according to claim 1, wherein the threshold is set to be small when the lane for passing is a traveling lane of the oncoming vehicle.

* * * * *